US012651289B2

(12) United States Patent
McDaniel

(10) Patent No.: US 12,651,289 B2
(45) Date of Patent: Jun. 9, 2026

(54) MOBILE-ASSISTED PICKER TECHNIQUES FOR IN-STORE NAVIGATION

(71) Applicant: NCR Voyix Corporation, Atlanta, GA (US)

(72) Inventor: Christian Lee McDaniel, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 878 days.

(21) Appl. No.: 17/731,796

(22) Filed: Apr. 28, 2022

(65) Prior Publication Data

US 2023/0005046 A1 Jan. 5, 2023

Related U.S. Application Data

(63) Continuation-in-part of application No. 17/366,451, filed on Jul. 2, 2021.

(51) Int. Cl.
*G06Q 30/0601* (2023.01)
*G06F 3/01* (2006.01)
*G06F 3/16* (2006.01)
(52) U.S. Cl.
CPC ......... *G06Q 30/0635* (2013.01); *G06F 3/016* (2013.01); *G06F 3/167* (2013.01); *G06Q 30/0613* (2013.01); *G06Q 30/0639* (2013.01)
(58) Field of Classification Search
None
See application file for complete search history.

(56) References Cited

U.S. PATENT DOCUMENTS

| | | | | |
|---|---|---|---|---|
| 11,417,179 B1 * | 8/2022 | Zalewski | ............... | H04W 4/80 |
| 2008/0077512 A1 | 3/2008 | Grewal | | |
| 2013/0283211 A1 | 10/2013 | Malkin et al. | | |
| 2020/0005385 A1 | 1/2020 | Stout et al. | | |

(Continued)

FOREIGN PATENT DOCUMENTS

| | | | |
|---|---|---|---|
| CN | 107169591 | | 9/2017 |
| CN | 114739408 | | 7/2022 |
| JP | 2016109570 A | * | 6/2016 |

OTHER PUBLICATIONS

JP-2016109570-A translation (Year: 2016).*

(Continued)

*Primary Examiner* — Michelle T Kringen
(74) *Attorney, Agent, or Firm* — Schwegman Lundberg & Woessner, P.A.

(57) ABSTRACT

An optimized route to pick a list of items through a store is obtained. Sensor data for a mobile device of a user is evaluated in real time to provide fine-grain orientation, direction, location, and behaviors of the user along the route during a picking session. A determination is made based on the sensor data and a current portion of the route that the user has picked a current item from the store and a next item along with its route guidance is provided to the user without any user action being required. In an embodiment, tactile, speech, and/or audible feedback is provided from the device when the determination is made that an item was picked by the user. In an embodiment, predefined movements of the device are identified as user-provided route commands and processed on behalf of the user during the session.

20 Claims, 3 Drawing Sheets

(56)         References Cited

U.S. PATENT DOCUMENTS

2020/0302510 A1 *   9/2020   Chachek ............... G06V 20/52

OTHER PUBLICATIONS

J. Chon and H. Cha, "LifeMap: A Smartphone-Based Context Provider for Location-Based Services," in IEEE Pervasive Computing, vol. 10, No. 2, pp. 58-67, Apr.-Jun. 2011, doi: 10.1109/MPRV.2011.13. (Year: 2011).*
"Translation of CN-114739408-A", 7 pgs.

* cited by examiner

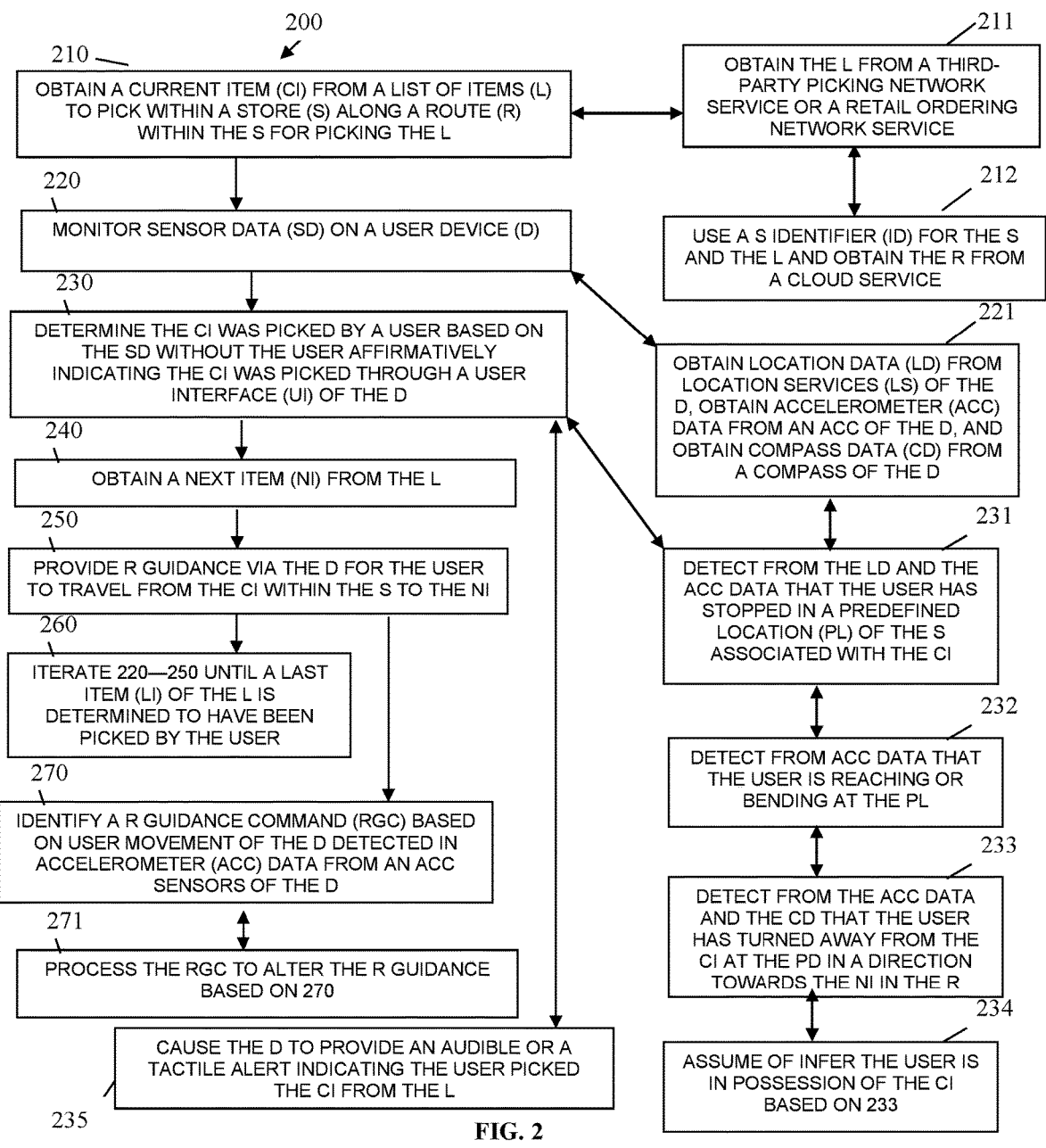

200

210
OBTAIN A CURRENT ITEM (CI) FROM A LIST OF ITEMS (L) TO PICK WITHIN A STORE (S) ALONG A ROUTE (R) WITHIN THE S FOR PICKING THE L

211
OBTAIN THE L FROM A THIRD-PARTY PICKING NETWORK SERVICE OR A RETAIL ORDERING NETWORK SERVICE

212
USE A S IDENTIFIER (ID) FOR THE S AND THE L AND OBTAIN THE R FROM A CLOUD SERVICE

220
MONITOR SENSOR DATA (SD) ON A USER DEVICE (D)

230
DETERMINE THE CI WAS PICKED BY A USER BASED ON THE SD WITHOUT THE USER AFFIRMATIVELY INDICATING THE CI WAS PICKED THROUGH A USER INTERFACE (UI) OF THE D

221
OBTAIN LOCATION DATA (LD) FROM LOCATION SERVICES (LS) OF THE D, OBTAIN ACCELEROMETER (ACC) DATA FROM AN ACC OF THE D, AND OBTAIN COMPASS DATA (CD) FROM A COMPASS OF THE D

240
OBTAIN A NEXT ITEM (NI) FROM THE L

250
PROVIDE R GUIDANCE VIA THE D FOR THE USER TO TRAVEL FROM THE CI WITHIN THE S TO THE NI

231
DETECT FROM THE LD AND THE ACC DATA THAT THE USER HAS STOPPED IN A PREDEFINED LOCATION (PL) OF THE S ASSOCIATED WITH THE CI

260
ITERATE 220—250 UNTIL A LAST ITEM (LI) OF THE L IS DETERMINED TO HAVE BEEN PICKED BY THE USER

232
DETECT FROM ACC DATA THAT THE USER IS REACHING OR BENDING AT THE PL

270
IDENTIFY A R GUIDANCE COMMAND (RGC) BASED ON USER MOVEMENT OF THE D DETECTED IN ACCELEROMETER (ACC) DATA FROM AN ACC SENSORS OF THE D

233
DETECT FROM THE ACC DATA AND THE CD THAT THE USER HAS TURNED AWAY FROM THE CI AT THE PD IN A DIRECTION TOWARDS THE NI IN THE R

271
PROCESS THE RGC TO ALTER THE R GUIDANCE BASED ON 270

234
ASSUME OF INFER THE USER IS IN POSSESSION OF THE CI BASED ON 233

CAUSE THE D TO PROVIDE AN AUDIBLE OR A TACTILE ALERT INDICATING THE USER PICKED THE CI FROM THE L

MOBILE-ASSISTED PICKER TECHNIQUES FOR IN-STORE NAVIGATION

RELATED APPLICATIONS

This application claims priority to, is co-pending with, and is a Continuation-In-Part (CIP) of application Ser. No. 17/366,451 entitled" "Methods and a System for In-Store Navigation" and filed Jul. 2, 2021; the disclosure of which is incorporated by reference herein in its entirety.

BACKGROUND

Profession pickers are a major source of income for grocery stores. If this was not already the case, it is now the cash in view of the COVID19 pandemic where many consumers began ordering their groceries through picking services. A picker is an individual that fulfills shopping lists for customers. Some pickers may be employees of a store that fulfills online shopping orders for its customer. The fulfilled orders can be subsequently picked up at the store or delivered directly to the homes of the customers. Other pickers are third-party services that contract out individuals to fulfill and deliver shopping orders to customers who order through their third-party applications.

The quicker a picker can navigate a store; the more orders can be fulfilled. Finding unfamiliar items in an unknown store can be a difficult, a chaotic, and a time-consuming exercise (causing shopping delays). Often, pickers (especially third-party contract pickers) are looking for items they are not familiar with in unfamiliar stores. Finding those items as part of a larger list can be difficult and frustrating.

To complicate matters, some pickers may be simultaneously picking multiple orders within a given store. Unless the picker manually pre-organizes and pre-plans, the picker may find that they are traversing the store or traversing same locations within the store multiple times, which is inefficient. Most third-party pickers receive the orders via a mobile application, such that opening one order, closing it, and opening another order on their phone while inside the store is not practical.

SUMMARY

In various embodiments, methods and a system for mobile-assisted picker techniques for in-store navigation are presented.

According to an aspect, a method for mobile-assisted picker techniques for in-store navigation is presented. A current item is obtained from a list of items to pick within a store along a route within the store for picking the list of items. Sensor data on a user device is monitored and a determination is made that the current item was picked by a user based on the sensor data without the user affirmatively indicating the current item was picked through a user interface of the device. A next item is obtained from the list of items and route guidance is provided through the user device for the user to travel from the current item within the store to the next item.

BRIEF DESCRIPTION OF THE DRAWINGS

FIG. 2 is a diagram of a method for mobile-assisted picker techniques for in-store navigation, according to an example embodiment.

DETAILED DESCRIPTION

Figure 1:
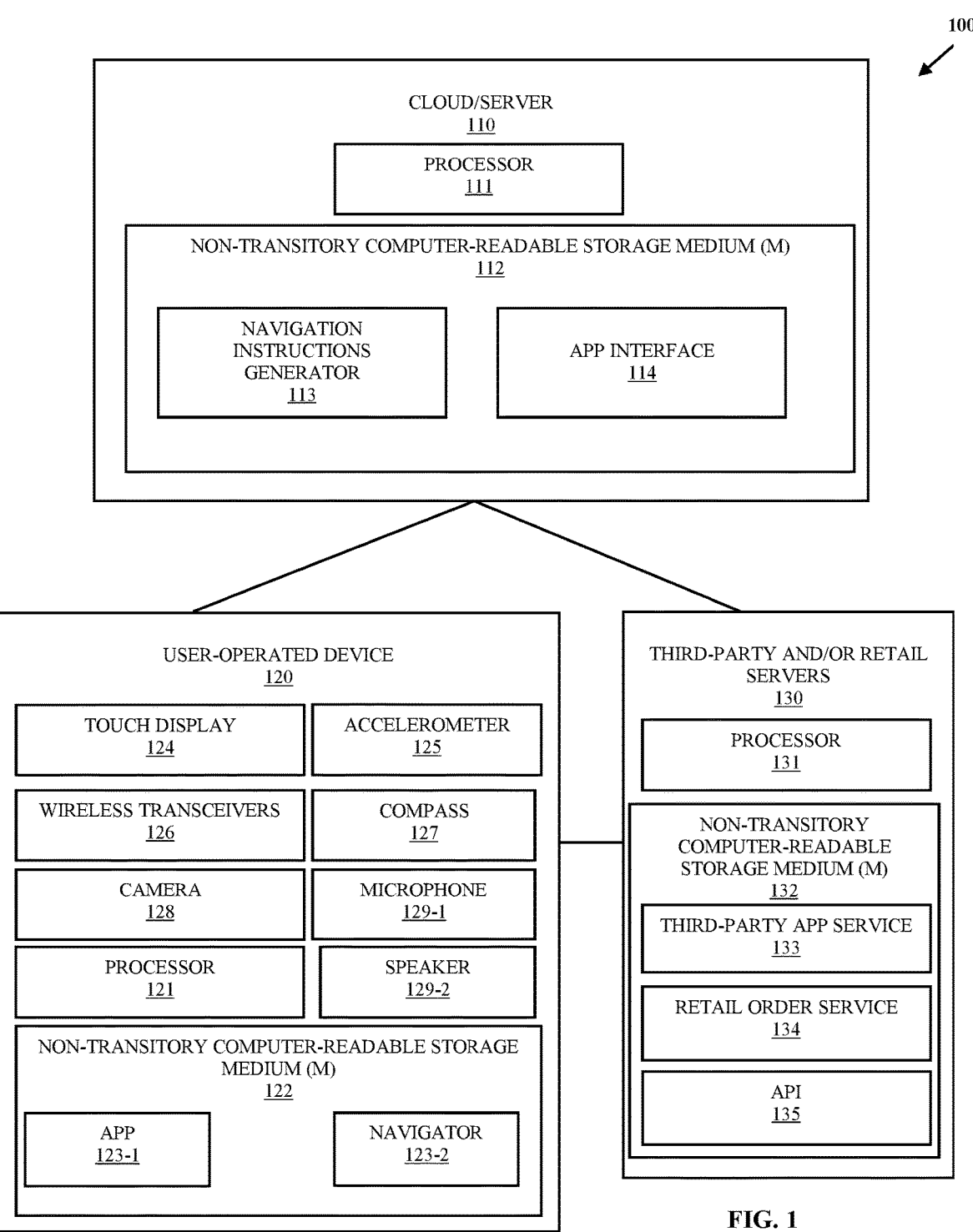
FIG. 1 is a diagram of a system for mobile-assisted picker techniques for in-store navigation, according to an example embodiment.

FIG. 1 is a diagram of a system 100 for mobile-assisted picker techniques for in-store navigation, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of providing mobile-assisted picker techniques for in-store navigation presented herein and below.

System 100 and the methods that follow permit a truly hands-free picking experience that can be utilized by customers having a shopping list or by professional pickers (pickers employed by a store and/or third-party contract-based pickers). Sensors and components of the user's mobile devices are tracked when the picker (user) enters a given store. A route for traversing the store to optimally pick the items of a shopping list along the route is pushed to the mobile device. The movements, directions, and pauses of the user are tracked relative to the route and inferences are made when the user is believed to have acquired an item from the list, the directions to the next item in the list is immediately rendered on the mobile device. The navigational guidance can be visual, audible, and/or tactile based through the user's mobile device so that the user can focus on navigating the store for items in the list without focusing on the mobile device. In an embodiment, specific movements by the user of the mobile device causes a previous navigation instruction to be loaded and presented to the user and/or a navigation instruction to be repeated for the user.

System 100 provides a fine-grain, rather than coarse-grain, interactive in-store navigation session with a user/picker for purposes of picking items from a shopping list from a given store. The navigational guidance during the session is intuitive and non-obtrusive, such that affirmative operation of the user's mobile device is not required, and the user can passively interact with the mobile device.

As used herein the terms "picker" and/or "user may be used interchangeably and synonymously. This refers to a customer of a store that is at a store with a mobile device to pick items off a shopping list or this refers to a professional individual employed by the store to fulfill online orders or a professional individual that contracts with a third-party ordering service to fulfilling online customer shopping lists for delivery to the customers.

System 100 comprises a cloud or server 110, a user-operated device 120, and optionally, includes a plurality of third-party servers and/or retail 130.

Cloud/Server 110 comprises at least one processor 111 and a non-transitory computer-readable storage medium 112. Medium 112 comprises executable instructions for a navigation instructions generator 113 and an application (app) interface 114. The executable instructions when executed by processor 111 from the medium 112 cause processor 111 to perform operations discussed herein and below with navigation instructions generator 113 and app interface 114.

Each user-operated device 120 comprises a processor 121 and a non-transitory computer-readable storage medium 122. Medium 122 comprises executable instructions for a mobile app 123-1 and/or a navigator 123-2. The executable instructions when executed by processor 121 from medium 122 cause processor 121 to perform operations discussed herein and below with respect to 123-1 and/or 123-2. Each user-operated device 120 also comprises a touch display 124, an accelerometer 125, one or more wireless transceivers 126, a compass 127, at least one camera 128, a microphone 129-1, and a speaker or a speaker input jack 129-2.

Each optional third-party and/or retail server 130 comprises a processor 131 and a non-transitory computer-readable storage medium 132. Medium 132 comprises executable instructions for a third-party app service 133, a retail order service 134, and an Application Programming Interface (API) 135. The executable instructions when executed by processor 131 from medium 132 cause processor 131 to perform operations discussed herein and below with respect to 133-135.

Navigation instructions generator 113 receives as input a list of items provided by app 123 or, optionally, provided via API 135 from third-party app service 133 and/or retail order service 134 to app interface 114. App 123 or API 135 also provides a store identifier or store name associated with a store for which the items on the list are to be purchased by a shopper (the shopper operates device 120).

Navigation instructions generator 113 inspects the map data (such as a planogram or modified and enhanced planogram) for a given store and connects the items on the list. Navigation instructions generator 113 constructs hierarchical map data from information maintained for the store using the store's items, regions, and endpoints as the nodes of the graph/map data. Each item in the list is then connected to that item's nearest endpoint and a pathfinding algorithm is processed to find an intermediate path between the endpoints. This results in a strongly-connect graph of the relevant endpoints (adjacency matrix).

Navigation instructions manager 113 then uses a modified Traveling Sales Person (TSP) algorithm to generate an optimized, ordered-list of items based on the optimal path through each endpoint.

Navigation instructions manager 113 produces the instructions from getting from item A to item B by analyzing each segment of the journey independently, such as: entrance→item 0, item 0→item 1, item 1→item 2, . . . item n→checkout. For each segment a Dijkstra algorithm is processed on the full graph, with item A as the start and item B as the destination.

Next, navigation instructions manager 113 groups the lists of endpoints by region and feeds a new instruction only when changing regions. This reduces the list of endpoints to contain only the necessary nodes for producing the navigation instructions for the shopper. For example, before reduction:

The above-referenced approach is repeated by the navigation instructions manager 113 for every pair of items within the list of items.

Finally, the list of regions are then translated into a list of intuitive instructions in text that can be read to the shopper and can be provided in any number of manners, such as through app 123, through an existing third-party app service 133 and/or retail order service 134, through navigator 123-2.

Once the route and the shopping list of items for an in-store session is know and delivered to navigator 123-2 and/or app 123-1. Navigator 123-2 monitors a current geographical location of the user for a location that corresponds with the store associated with the shopping list and the route. App 123-1 may also include a user-facing interface option for the user to indicate that the user is at the entrance of the store and desires to being the picking session along the route for the items on the shopping list. Still further, the user may scan a barcode placed at the entrance of the store from within a user-interface screen of app 123-1 which initiates the picking session.

Once the picking session is initiated either through user affirmative action or no affirmative action of the user by mapping a current location of device 120 to a location known to be associated with the store, navigator 123-2 begins to track and monitor with various sensors (accelerometer 125 and compass 127) and/or interact and monitor other integrated devices (wireless transceivers 126, camera 128, microphone 129-1, and speaker 129-2).

Accelerometer 125 provides data on acceleration forces on device 120, such that the device's position in space, vibration, and movement of the device 120 can be tracked and monitored by navigator 123-2. The accelerometer's data also allows for the orientation of the device to be derived based on acceleration due to Earth's gravity on device 120.

Compass 127 provides more detailed data on a current orientation of the device 120 being operated by the user during the picking session.

During the picking session, navigator 123-2 processes a next item on the list based on its route data and location data within the store while monitoring a near exact physical location of device 120 and its orientation using the data provided by the accelerometer 125 and/or compass 127. When a user is detected as stopping and reaching, this can be ascertained from the accelerometer data and/or compass data and mapped to a corresponding known location of an item on the shopping list. Once the user is stopped at a location where the next item is known to be and reaches or bends down, navigator 123-2 infers or assumes that the user has picked that item and immediately begins to provide navigational route guidance for a next item on the shopping list defined in the route. The user does not have to interact with the user-facing interface of app 123-1 to press an interface button indicating that the user is ready to move on to a next item.

In this way, the user is not required to actively interact with app or affirmatively operate app 123-1 during the picking session, rather since fine-grain details about the user is being tracked with respect to a current item that is being picked and the route through the sensor data (accelerometer 125 and/or compass 127) include fine-grain location data, orientation data for (reaching or bending down), navigator 123-2 identifies when an item is picked and immediately advances in the route to the next item that is to be picked. Turning, stopping, stepping, bending, current directions of the user within the store, current orientations of the user within the store, and reaching are all behaviors that navigator 123-2 tracks for the user through device 120 based on the data provided by the accelerometer 125 and/or compass 127. The user's attention is directed to identifying an item that is to be picked and picking it without interacting with app 123-1. This creates a seamless and efficient picking session and one in which the user does not have to handle the picked items from the list while at the same time attempting to interact with the user-facing interface of app 123-1.

The above-referenced navigation guidance continues until the last item (no more next items to pick) is picked from the shopping list and the route through the store concludes.

In an embodiment, during the picking session navigator 123-2 and/or app 123-1 can provide feedback and/or guidance to the user in a number of unobtrusive manners. For example, speech guidance can be provided through a speaker 129-2 that provides meaningful guidance to the user along the route, such as at the beginning of the session providing speech through speaker 129-2 indicating that the first item is a 12 pack of Coke® located in aisle 10 reached by turning left past the registers and 10 feet thereafter turn right into aisle 10. When navigator 123-2 determines an item was picked a bell or beep can be played through speaker 129 or speech may indicate coke has been picked, still further, navigator 123-2 can cause the device 120 to vibrate as tactile feedback that the item being picked was determined to have been picked by the user and navigator 123-2 is moving to the next item along the route to pick from the shopping list. In addition to predefined sounds, beeps, and/or tactile-based feedback, a user-facing interface of app 123-1 may be updated visual to indicate a checkmark next to the item that was determined to be picked and the route to the next item in the list displayed along with written navigational guidance. In fact, navigational guidance and feedback for picked items can be done in any combination of or in all the manners that was discussed above via speech, visual information, predefined audible tones, and/tactile notifications.

In an embodiment, navigator 123-2 also responds and processes user-received command which may be provided through speech through microphone 129-1 or by the user moving device 120 in predefined manners that are mapped to user commands. For example, if the user shakes device 120 or moves device 120 is a particular way (Up and down, side to side, etc.), the accelerometer's data for the device 120 is detected as being the movement reserved as a known user command and navigator 123-2 processes the command. For example, a command may be to repeat a current navigation instruction to a next item in the list, go back to the last picked item instruction, move head a predefined number of items in the list and start route guidance from that point. The user can use predefined movements of device 120 to communicate a route guidance command and/or the user can use speech spoken into microphone 129-1, which is translated into text and mapped to the route guidance command. In this way, the picking session is interactive and yet still largely passive because the user does not have to interact with any user-facing interface option through touch display 124 to interact during the picking session with navigator 123-2; rather, the user can speak a command and/or move/shake device 120 in a reserved and predefined manner for navigator 123-2 to identify a user-directed command and process the command during the session. The user is not required to provide input or direction through touches to touch display 124 during the session, which allows the user to adjust the session based on the needs of the user while only minimally interacting with device 120.

In an embodiment, navigator 123-2 may be subsumed within and processed as part of app 123-1.

In an embodiment, navigator 123-2 is a plug-in or enhanced to an existing app 123-1.

In an embodiment, navigator 123-2 is processed on a remote device remote from device 120 (such as cloud/server 110) and interacts in real time with device 120, components 124-129-2 and app 123-1. In this embodiment, all accelerometer data, location data for location services of device

120, and compass data are streamed in real time to a remotely operating version of navigator 123-2.

In an embodiment, navigator 123-2 utilizes wireless signals to enhance the accuracy of pinpointing an exact location at any given point in time of device 120 within the store during the picking session.

In an embodiment, navigator 123-2 utilizes video frames (when provided or available) from camera 128 to calibrate any given current location of device 120 within the store during a picking session.

In an embodiment, the device 120 is a phone, a tablet, a laptop, or a wearable processing device.

The above-referenced embodiments and other embodiments are now discussed with reference to FIG. 2.

FIG. 2 is a diagram of a method 200 for mobile-assisted picker techniques for in-store navigation, according to an example embodiment. The software module(s) that implements the method 200 is referred to as a "in-store picklist route guidance manager." The in-store picklist route guidance manager is implemented as executable instructions programmed and residing within memory and/or a non-transitory computer-readable (processor-readable) storage medium and executed by one or more processors of one or more devices. The processor(s) of the device(s) that executes the in-store picklist route guidance manager are specifically configured and programmed to process the in-store picklist route guidance manager. The in-store picklist route guidance manager has access to one or more network connections during its processing. The connections can be wired, wireless, or a combination of wired and wireless.

In an embodiment, the device that executes the in-store picklist route guidance manager is cloud 110. In an embodiment, the device that executes in-store picklist route guidance manager is user-operated device 120.

In an embodiment, the in-store picklist route guidance manager is all of, or some combination of navigation instructions manager 113, app interface 114, app 123-1, and/or navigator 123-2.

At 210, in-store picklist route guidance manager obtains a current item from a list of items to pick within a store along a route within a store. The route may be optimally produced by navigation instructions generator 113 as discussed above.

In an embodiment, at 211, the in-store picklist route guidance manager obtains the list (picklist) from a third-party network service 133 or a retail ordering service 134.

In an embodiment of 211 and at 212, the in-store picklist route guidance manager uses a store identifier for the store and the list (picklist) and obtains the route from a cloud service, such as navigation instructions generator 113.

At 220, the in-store picklist route guidance manager monitors sensor data generated by and from a user device 120.

In an embodiment, at 221, the in-store picklist route guidance manager obtains location data from location services of the user device 120, obtains accelerometer data from an accelerometer 125 of the user device 120, and obtains compass data from a compass 125 of the user device 120.

At 230, the in-store picklist route guidance manager determines the current item was picked by a user based on the sensor data without the user affirmatively indicating the current item was picked through a user interface of the user device 120.

In an embodiment of 221 and 230, at 231, the in-store picklist route guidance manager detects from the location data and the accelerometer data that the user has stopped in a predefined location of the store that is known to be associated with the current item.

In an embodiment of 231 and at 232, the in-store picklist route guidance manager detected from the accelerometer data that the user is reaching or bending at the predefined location.

In an embodiment of 232 and at 233, the in-store picklist route guidance manager detects from the accelerometer and the compass data that the user has turned away from the current item at the predefined location in a direction toward the next item in the route.

In an embodiment of 233 and at 234, the in-store picklist route guidance manager assumes or infers that the user is in possession of the current item based on 233.

In an embodiment, at 235, the in-store picklist route guidance manager causes the device to provide an audible or a tactile alert indicating to the user of the user device 120 the user is believed to have picked the current item and route guidance is moving on to the next item in the picklist (list) associated with the route.

At 240, the in-store picklist route guidance manager obtains a next item from the list using the route.

At 250, the in-store picklist route guidance manager provides route guidance via the user device 120 for the user to travel from the current item within the store to the next item of the list.

In an embodiment, at 260, the in-store picklist route guidance manager iterates back to 220 through 250 until a last item is determined to have been picked by the user.

In an embodiment, at 270, the in-store picklist route guidance manager identifies a route guidance command based on user movement of the user device 120 that is detected in accelerometer data from an accelerometer sensor 125 of the user device 120.

In an embodiment of 270 and at 271, the in-store picklist route guidance manager processes the route guidance command to alter the route guidance based on 270, for example by repeating route guidance for the current item or the next item, skipping ahead to a further item beyond the next item, etc.

Figure 3:
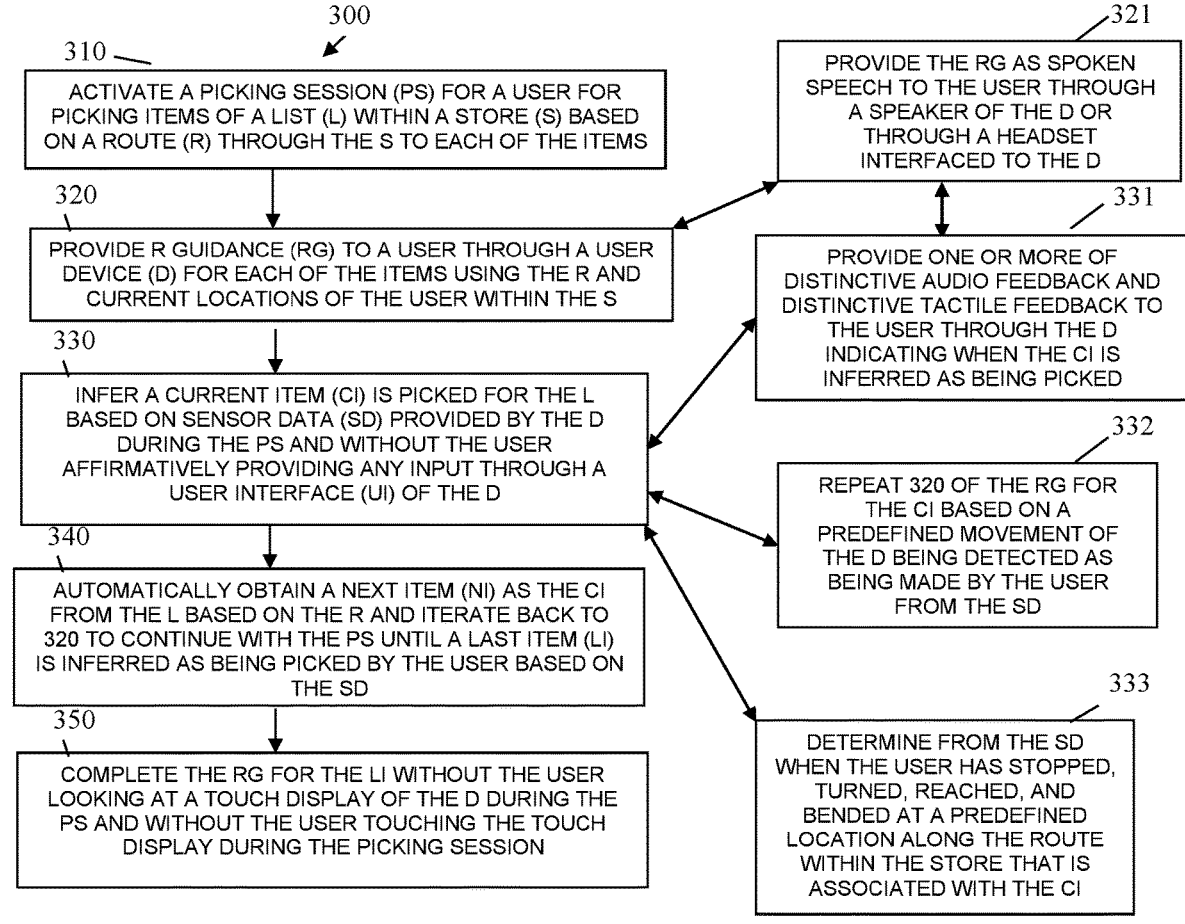
FIG. 3 is a diagram of another method for mobile-assisted picker techniques for in-store navigation, according to an example embodiment.

FIG. 3 is a diagram of another method 300 for mobile-assisted picker techniques for in-store navigation, according to an example embodiment. The software module(s) that implements the method 300 is referred to as a "route guidance manager." The route guidance manager is implemented as executable instructions programmed and residing within memory and/or a non-transitory computer-readable (processor-readable) storage medium and executed by one or more processors of one or more devices. The processor(s) of the device(s) that executes the route guidance manager are specifically configured and programmed to process the route guidance manager. The route guidance manager has access to one or more network connections during its processing. The network connections can be wired, wireless, or a combination of wired and wireless.

In an embodiment, the device that executes the route guidance manager is cloud 110. In an embodiment, the device that executes the route guidance manager is user-operated device 120.

In an embodiment, the route guidance manager is all of, or some combination of navigation instructions manager 113, app interface 114, app 123-1, navigator 123-2, and/or method 200.

The processing of the route guidance manager represents another and, in some ways, enhanced processing perspective from that which was discussed above with system 100 of FIG. 1, and method 200 of FIG. 2.

At 310, the route guidance manager activates or establishes a picking session for a user for picking items of a list (picklist) within a given store based on a route through the store to each of the items.

At 320, the route guidance manager provides route guidance to the user through a user device 120 for each of the items using the route and current locations of the user (based on locations tracked for the user device 120) within the store.

In an embodiment, at 321, the route guidance manager provides the route guidance as spoken speech to the user through a speaker 129-2 of the user device 120 or through a headset interfaced to the user device 120.

At 330, the route guidance manager infers a current item is picked from the list (picklist) based on sensor data provided by the user device 120 during the picking session and without the user affirmatively providing any input through a user-facing interface of the user device 120.

In an embodiment of 321 and 330, at 331, the route guidance manager provides one or more of distinctive audio feedback and distinctive tactile feedback (distinctive user device 120 vibrations) to the user through the user device 120 indicating when the current item is inferred as being picked by the user during the picking session.

In an embodiment, at 332, the route guidance manager repeats 320 of the route guidance for the current item based on a predefined movement of the user device 120 being detected as being made by the user from the sensor data. That is, the user issues a route-based command by moving and/or orienting the user-device 120 in a predefined manner, which is then detected in the sensor data and processed by route guidance manager.

In an embodiment, at 333, the route guidance manager determines from the sensor data when the user has stopped, turned, reached, and bended at a predefined location along the route within the store that is associated with the current item.

At 340, the route guidance manager automatically obtains a next item as the current item from the list (picklist) based on the route and iterated back to 320 to continue with the picking session until a last item is inferred as being picked by the user based on the sensor data.

In an embodiment, at 350, the route guidance manager completes the route guidance for the last item without the user looking at a touch display 124 of the user device 120 during the picking session and without the user touching the touch display 124 during the picking session.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

obtaining a current item from a list of items to pick within a store along a route within the store for picking the list of items;

monitoring sensor data on a user device;

determining the current item was picked by a user based on the sensor data without the user affirmatively indicating the current item was picked through a user interface of the user device, obtaining a next item from the list of items; and providing route guidance through the user device for the user to travel from the current item within the store to the next item;

wherein providing further includes:

providing the route guidance as spoken speech to the user through a speaker of the user device or through a headset interfaced to the user device;

wherein determining further includes:

monitoring fine-grain details about the user with respect to the current item that is being picked through the sensor data;

obtaining location data from location services of the user device, obtaining accelerometer data from an accelerometer of the user device, and obtaining compass data from a compass of the user device;

detecting from the location data and the accelerometer data that the user has stopped in a predefined location of the store associated with the current item;

detecting from the accelerometer data that the user is reaching or bending at the predefined location;

detecting from the accelerometer data and the compass data that the user has turned away from the current item at the predefined location in a direction towards the next item on the route; and immediately beginning to provide the route guidance for the next item in response to the detecting that the user has turned away from the current item at the predefined location.

2. The method of claim 1, wherein obtaining further includes obtaining the list of items from a third-party picking network service of a retail ordering network service.

3. The method of claim 2, wherein obtaining further includes using a store identifier for the store and the list of items and obtaining the route from a cloud service.

4. The method of claim 1, wherein monitoring further includes obtaining location data from location services of the user device, obtaining accelerometer data from an accelerometer of the user device, and obtaining compass data from a compass of the user device, wherein the sensor data comprises the location data, the accelerometer data, and the compass data.

5. The method of claim 4, wherein determining further includes detecting from the location data and the accelerometer data that the user has stopped in a predefined location of the store associated with current item.

6. The method of claim 5, wherein detecting further includes detecting from the accelerometer data that the user is reaching or bending at the predefined location.

7. The method of claim 6, wherein detecting further includes detecting from the accelerometer data and the compass data that the user has turned away from the current item at the predefined location in a direction towards the next item on the route.

8. The method of claim 7, wherein detecting further includes assuming or inferring that the current item is in possession of the user based on the detecting that the user has turned away from the current item at the predefined location towards the next item on the route.

9. The method of claim 1, wherein determining further includes causing the user device to provide an audible or a tactile alert indicating the user picked the current item from the list of items.

10. The method of claim 1 further comprising, iterating back to the monitoring until a last item of the list of items is determined to have been picked by the user.

11. The method of claim 1 further comprising, identifying a predefined route guidance command based on user movement of the user device detected in accelerometer data from an accelerometer sensor of the user device.

12. The method of claim 11, further comprising, processing the predefined route guidance command to alter the route guidance based on the identifying.

13. A method, comprising:

activating a picking session with a user for picking items of a list within a store based on a route through the store for each of the items;

providing route guidance to a user through a user device for each of the items using the route guidance and current locations of the user within the store;

inferring a current item is picked for the list based on sensor data provided by the user device during the picking session and without the user affirmatively providing any input through a user-interface of the user device; and automatically obtaining a next item as the current item from the list based on the route and iterating back to the providing to continue with the picking session until a last item is inferred as being picked by the user based on the sensor data;

wherein providing further includes:

providing the route guidance as spoken speech through a speaker of the user device indicating particular guidance to the user along the route; and wherein inferring further includes:

the user not being required to actively interact with or affirmatively operate an application during the picking session;

monitoring fine-grain details about the user with respect to the current item that is being picked through the sensor data;

obtaining location data from location services of the user device, obtaining accelerometer data from an accelerometer of the user device, and obtaining compass data from a compass of the user device;

detecting from the location data and the accelerometer data that the user has stopped in a predefined location along the route within the store that is associated with the current item;

detecting from the accelerometer data that the user is reaching or bending at the predefined location;

detecting from the accelerometer data and the compass data that the user has turned away from the current item at the predefined location in a direction towards a next item on the route; and immediately beginning to provide the route guidance for the next item in response to the detecting that the user has turned away from the current item at the predefined location.

14. The method of claim 13, wherein providing further includes providing the route guidance as spoken speech to the user through a speaker of the user device or through a headset interfaced to the user device.

15. The method of claim 14, wherein inferring further includes providing one or more of distinctive audible feedback and distinctive tactile feedback to the user through the user device indicating when the current item was inferred as being picked by the user.

16. The method of claim 13, wherein inferring further includes repeating the providing of the route guidance for the current item based on a predefined movement of the user device being detected as having been made by the user from the sensor data.

17. The method of claim 13, wherein inferring further includes determining from the sensor data when the user has stopped, turned, reached, and bended at a predefined location along the route within the store that is associated with the current item.

18. The method of claim 13 further comprising, completing the route guidance for the last item without the user looking at a touch display of the user device during any of the picking session and without the user touching the touch display during any of the picking session.

19. A device, comprising:

an accelerometer, a processor and a non-transitory computer-readable storage medium;

the non-transitory computer-readable storage medium comprises executable instructions; and the executable instructions executed by the processor from the non-transitory computer-readable storage medium causing the processor to perform operations comprising:

providing speech-based route guidance to a user to pick a list of items along a route within a store;

wherein the speech-based route guidance provides particular guidance through a speaker indicating that a first item is located in a specific aisle reached turning at one or more specific areas within the store and turning into the specific aisle;

inferring a current item within the list of items was picked by the user based on data provided by the accelerometer; and automatically obtaining a next item of the list of items along the route based on the inferring and iterating back to the providing until a last item of the list of items is inferred as having been picked by the user;

wherein inferring further includes:

monitoring fine-grain details about the user with respect to the current item that is being picked through sensor data from the device;

obtaining location data from location services of the device, and obtaining compass data from a compass of the device;

detecting from the location data and data from the accelerometer that the user has stopped in a predefined location of the store associated with the current item;

detecting from the data from the accelerometer that the user is reaching or bending at the predefined location;

detecting from the data from the accelerometer and the compass data that the user has turned away from the current item at the predefined location in a direction towards the next item along the route;

immediately beginning to provide the speech-based route guidance for the next item in response to the detecting that the user has turned away from the current item at the predefined location.

20. The device of claim 19, wherein the device is a phone, a laptop, a tablet, or a wearable processing device.

* * * * *